June 28, 1966   A. J. L. NICOLAS   3,258,134
SHOCK ABSORBERS HAVING LARGE ENERGY ABSORBING CAPACITIES
Filed April 28, 1964
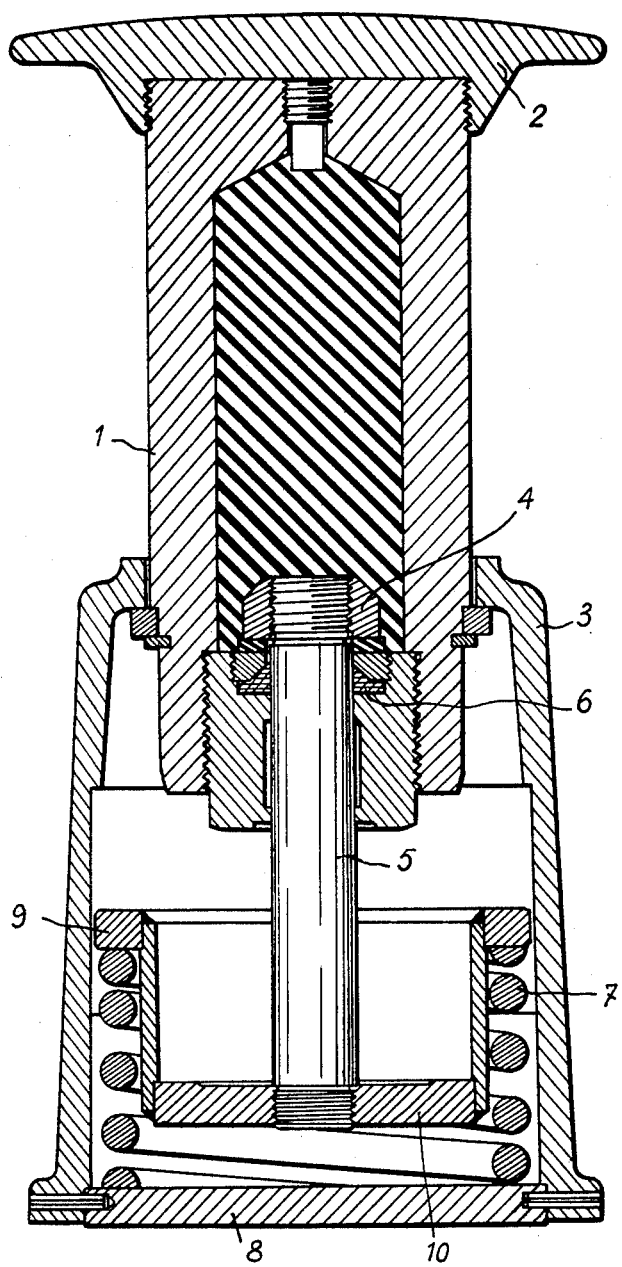

US patent 3,258,134 — Patented June 28, 1966

3,258,134
SHOCK ABSORBERS HAVING LARGE ENERGY ABSORBING CAPACITIES

Alain Jean Louis Nicolas, Choisy-le-Roi, France, assignor to Société d'Exploitation des Ressorts Autoamortisseurs Jarret, Paris, France, a French company
Filed Apr. 28, 1964, Ser. No. 363,087
Claims priority, application France, Apr. 29, 1963, 933,014, Patent 1,363,297
1 Claim. (Cl. 213—221)

The present invention relates to shock absorbers or thrust bearings and more particularly to devices of this class capable of absorbing large quantities of energy.

There presently exists a variety of devices for absorbing the energy produced by the coming together of two masses in movement with respect to each other, the absorption being effected by interposing between the masses a shock absorbing spring comprising a body of compressible liquid or elastomer. Devices of this type find wide application, for example, in bumpers, or buffers, for railway vehicles and as safety abutments for rolling bridges or drawbridges. Devices of this type will be generally referred to as "shock absorbers" in the present specification and it is to be understood that this term is intended to be employed herein in its generic sense and to include abutments, bumpers, buffers and mechanical stops and thrust blocks in general.

It has been found that shock absorbers of the above described type possess certain shortcomings which cause: On the one hand, a decrease in their elasticity (particularly in the initial portion of their movement) after having undergone a large number of operating cycles, and, on the other hand, imperfect static or dynamic reactions during the initial part of their travel, due mainly to friction or to variations in the characteristics of the materials due to changes in temperature.

It is an object of the present invention to provide for the construction of shock absorbing devices which are not subject to these drawbacks.

The embodiments of the present invention are characterized by the fact that a high strength, compressible, shock-absorbing spring is combined with a much weaker metallic spring, a helical spring for example, which is mounted either in series or in parallel with it.

Regardless of which type of mounting is used, means are provided which will limit the degree of compression of the metallic spring so as to prevent it from passing its elastic limit. These means may consist of one or several abutting elements which permit the compressive stress to be transmitted to the high strength spring before the weaker spring reaches its elastic limit.

When the two springs are arranged in parallel the device must be constructed so that the travel of the load bearing point on the metallic spring is distinctly greater than its travel on the high strength spring.

In order to permit a better understanding of this invention, a preferred embodiment of this invention, intended to serve only as an example of the many forms which the the present invention may take, is shown in longitudinal cross-sectional view in the single figure of the drawings.

In the figure, this embodiment comprises a high strength spring of the hydrostatically compressible elastomer type, which is well-known per se, constituted by a cylinder 1 filled with an elastomer material. The cylinder 1 serves to absorb the shocks delivered to the bearing plate 2 and is adapted to be driven in response thereto into the housing 3. The latter housing is rigidly fastened to the member to which the deadened shocks are to be transmitted. A plunger piston 4 penetrates into one end of cylinder 1, the piston comprising a rod 5 which passes through an impermeable fitting 6. The elastomer is thus compressed by the penetration of the piston and its rod into the cylinder 1, the strength of the resulting spring corresponding to the maximum stress which it can withstand.

According to the concept of the present invention, this hydrostatic spring is combined with a metallic helical spring 7 inserted between the base or end wall 8 of housing 3 and a support bearing, or boss, 9 which is rigidly connected to a plate 10. The plate 10 is in turn mounted on the end of piston rod 5. The metallic spring 7 is chosen so as to have a much lower strength, i. e. so as to be much more easily compressible, than the elastomer spring with which it is combined.

In the arrangement above described, a force applied to bearing plate 2 is initially insufficient to cause the penetration of piston 4 into the cylinder 1 and, instead, is transmitted by the plate 10 and the support bearing 9 to the spring 7, thereby compressing the latter. This compression continues until plate 10 comes to abut against the base 8. During this initial shock absorbing phase the operating characteristics of the device are rigidly defined since they are exclusively, or almost exclusively, functions of the behavior of the metallic spring.

At the moment when the plate 10 comes to rest against base 8, the balance of the force applied to bearing 2 is no longer transmitted to spring 7 and it is directly applied to the elastomer spring, the movement of cylinder 1 into housing 3 causing the piston 4 to penetrate into the elastomer filled volume of cylinder. The high-strength elastomer spring can thus be compressed up to its maximum capacity without any risk of damaging metallic spring 7.

While one embodiment of the present invention has been shown and described in detail, it may be noted that many modifications could be made without departing from the spirit of the teachings contained herein. It is therefore intended that the scope of this invention be limited only by the breadth of the appended claim.

What I claim is:

A shock absorber comprising a housing, a cylinder slidably mounted within one end of said housing and extending outwardly therefrom, elastomeric material filling said cylinder, a piston slidably mounted within said cylinder and adapted to compress said elastomer, a piston rod slidably mounted in this one end of said cylinder and extending into said housing, one end of said piston rod being secured to said piston, a plate positioned within said housing, the opposite end of the piston rod being secured to said plate, a support bearing secured to said plate, a coil spring mounted within said housing between said support bearing, and an end wall of the housing, said spring biasing the clyinder outwardly of the housing, whereby when a force is applied urging the cylinder into the housing the coil spring is compressed until the plate abuts the end wall of the housing, whereupon continued movement of the cylinder into the housing causes the piston to slide inwardly of the cylinder to thereby compress the elastomeric material.

References Cited by the Examiner
UNITED STATES PATENTS

| | | | |
|---|---|---|---|
| 2,656,935 | 10/1953 | Danielson et al. | 213—32 |
| 2,760,651 | 8/1956 | Campbell | 213—31 |
| 2,846,211 | 8/1958 | Taylor | 267—63 |
| 2,994,524 | 8/1961 | Jarrett et al. | 267—1 |

ARTHUR L. LA POINT, *Primary Examiner.*

MILTON BUCHLER, *Examiner.*

B. FAUST, *Assistant Examiner.*